United States Patent [19]
Moran

[11] 3,945,309
[45] Mar. 23, 1976

[54] COOKING APPARATUS FOR LOOSE FOOD PRODUCTS

[75] Inventor: Vernon J. Moran, Atherton, Calif.

[73] Assignee: Bomor Equipment, Inc., Atherton, Calif.

[22] Filed: Dec. 2, 1974

[21] Appl. No.: 528,686

[52] U.S. Cl............................. 99/348; 259/108
[51] Int. Cl.²........................................ A47J 27/14
[58] Field of Search .. 99/348; 259/107, 108, 178 A, 259/106, 102, 103, 116, 7, 8

[56] References Cited
UNITED STATES PATENTS

| | | | |
|---|---|---|---|
| 2,477,416 | 7/1949 | Page | 99/348 |
| 3,167,453 | 1/1965 | Cretors | 259/108 |
| 3,176,968 | 3/1965 | Appleton | 259/108 |
| 3,201,095 | 8/1965 | Erwien | 259/108 |
| 3,739,710 | 6/1973 | Costa | 99/348 |

*Primary Examiner*—Robert W. Jenkins
*Attorney, Agent, or Firm*—Stanley Bialos; Julian Caplan

[57] ABSTRACT

Cooking apparatus for loose food products comprises a bowl having support means resting on the top or rim thereof carrying downwardly extending prongs for breaking up loose product carried by a scraper blade rotatable over the bottom of the bowl, and also carrying downwardly extending paddles which remove product carried by the scraper blade. A drive shaft extending upwardly from below the bottom of the bowl is detachably connected to a hub to which the scraper blade is connected. The support means for the prongs and paddles is removably mounted on the top rim or edge of the bowl to enable ready detachment for cleaning purposes. Disconnection of the drive shaft from the blade hub permits ready removal of the bowl for cleaning purposes; the bowl being removably mounted on a support stand. The drive shaft includes a detachable connection so that the bowl may be tilted on the stand to pour grease therefrom. Heating means, desirably a gas burner, is provided below the bowl bottom to heat the contents as they are mixed.

8 Claims, 14 Drawing Figures

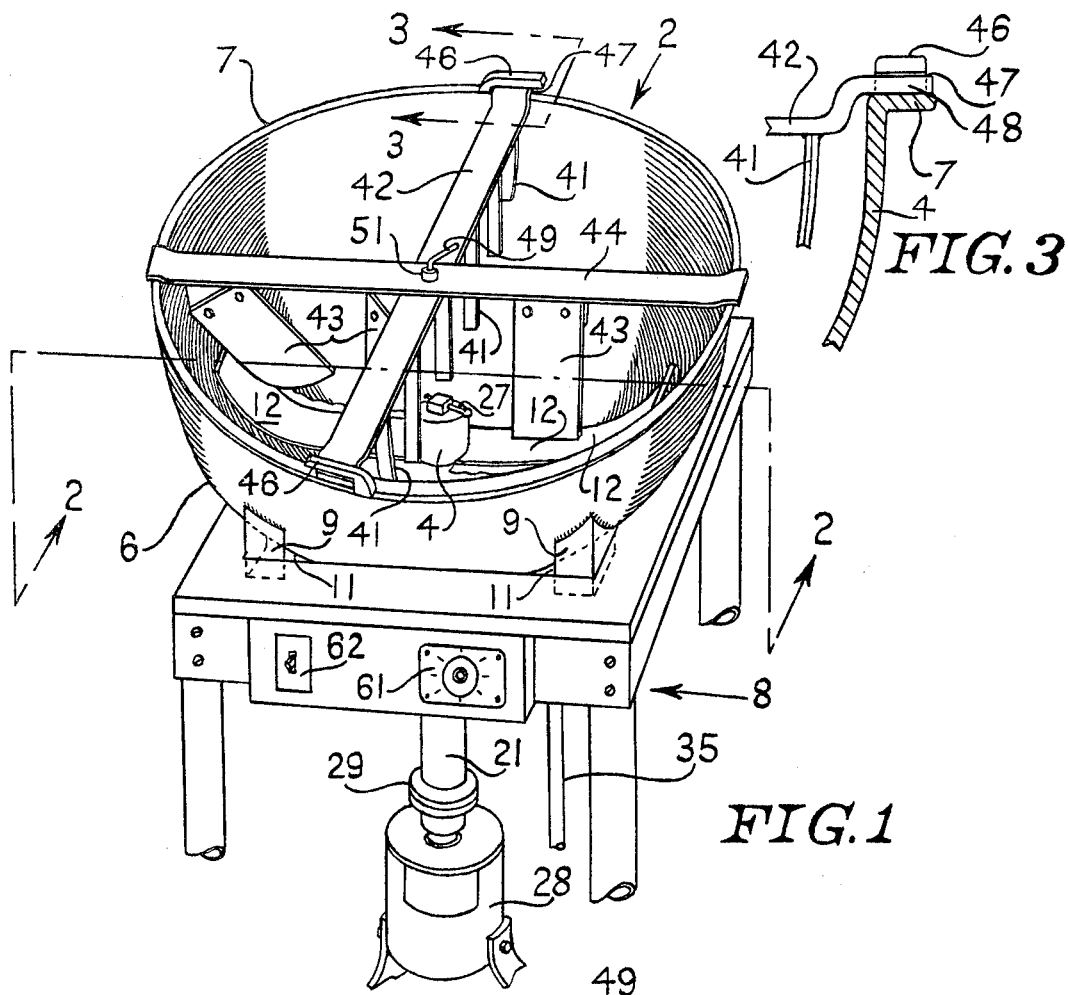
FIG. 3
FIG. 1
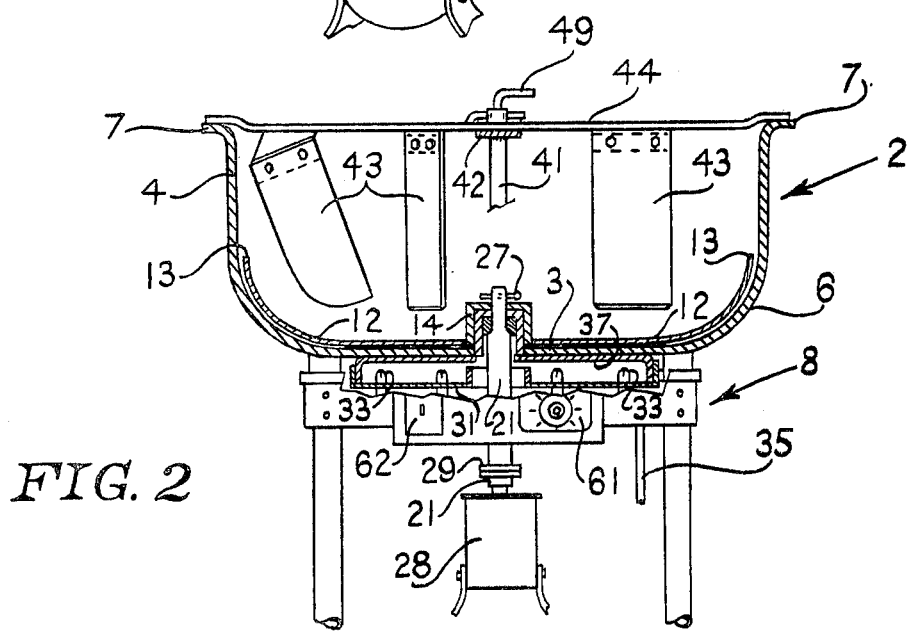
FIG. 2

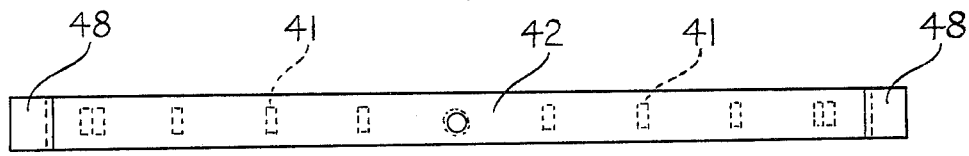
FIG. 4
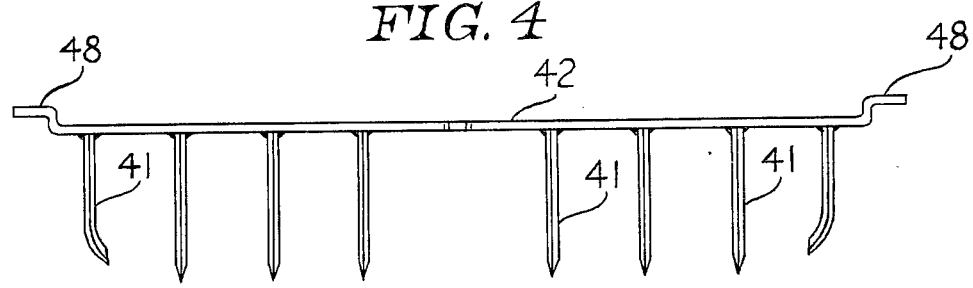
FIG. 4A
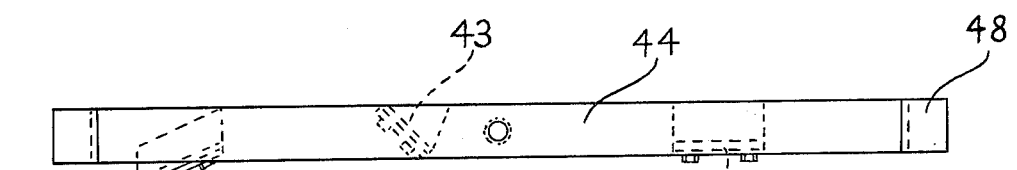
FIG. 5
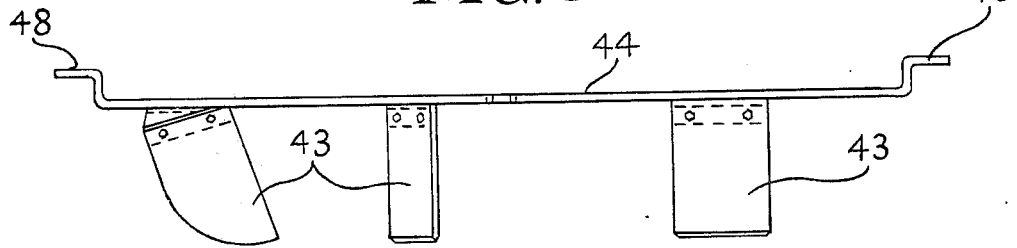
FIG. 5A
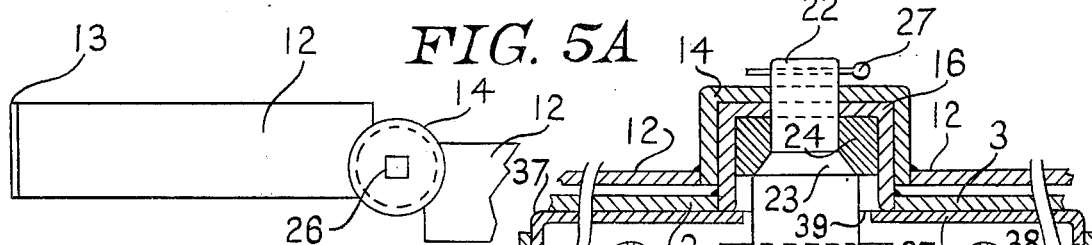
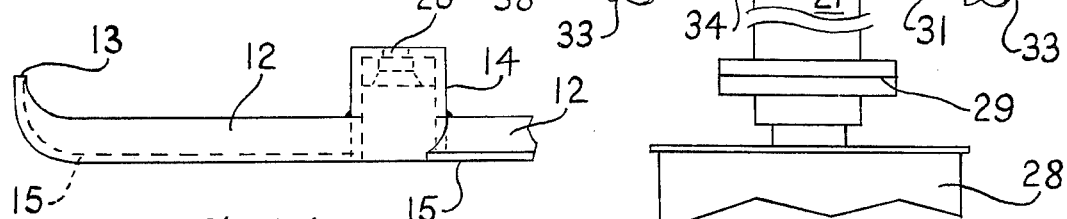
FIG. 6
FIG. 6A
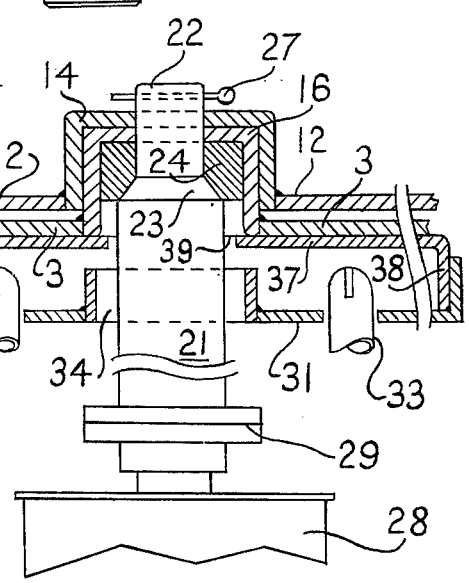
FIG. 9

COOKING APPARATUS FOR LOOSE FOOD PRODUCTS

This invention relates to cooking apparatus; particularly adapted for the heating and mixing of loose products such as ground meat used in hamburgers and tacos, and refried beans.

SUMMARY AND OBJECTS OF THE INVENTION

Summarizing the invention, it comprises a bowl which is removably mounted by suitable means on a support stand so that the bowl may be removed for cleaning purposes. Removably mounted support means is provided on the top edge or rim of the bowl carrying downwardly extending prongs for breaking up cold chunks and mixing the loose product as it is carried by blades rotatable about an axis and which scrape the product from the bottom of the bowl to prevent sticking thereof to the bowl bottom, as well as mixing the product. Also extending downwardly from the removable support means are paddles which, as the blades rotate, serve to remove product carried thereby.

The scraper and mixing blades are detachably connected to a drive shaft extending upwardly through the bowl bottom, thus enabling the bowl to be disconnected and removed for cleaning purposes or otherwise; and the drive shaft includes a detachable connection whereby the bowl may be tilted on the support stand for pouring grease or other liquids therefrom which may accumulate.

A burner, desirably a gas burner, is carried by the bowl support stand below the bottom of the bowl, and a heat distribution flame shield is provided over the burner. With the described construction, the prongs and the paddles as well as the bowl may be readily removed for cleaning or other purposes.

From the preceding it is seen that the invention has as its objects, among others, the provision of an improved cooking apparatus for loose products in which parts thereof are constructed and arranged for ready disconnection to allow cleaning thereof, and wherein a drive shaft through the bottom of the bowl does not necessitate handling drive means above or on top of the bowl when the bowl is to be removed for cleaning, and which is of simple, economical and efficient construction. Other objects will become apparent from the following more detailed description and accompanying drawings of a preferred embodiment, in which:

DESCRIPTION OF THE DRAWINGS

FIG. 1 is an isometric view of the cooking apparatus;

FIG. 2 is a transverse vertical section taken in a plane indicated by line 2 — 2 in FIG. 1;

FIG. 3 is a fragmentary sectional elevation taken in a plane indicated by line 3 — 3 in FIG. 1;

FIG. 4 is a top plan view of a bar removably supported on the top rim of the bowl and carrying downwardly extended breaker teeth or prongs;

FIG. 4A is a side elevational view of the structure of FIG. 4;

FIG. 5 is a top plan view of another bar removably supported on the rim of the bowl and carrying downwardly extending paddles;

FIG. 5A is a side elevational view of the structure shown in FIG. 5;

FIG. 6 is a fragmentary plan view of a rotatable hub and scraper blades rigidly attached thereto, which are rotated about the axis of the hub over the bottom of the bowl;

FIG. 6A is a side elevational view of the structure shown in FIG. 6;

FIG. 9 is an enlarged fragmentary vertical sectional view of drive means for scraper blades of the bowl, and of the burner below the bowl bottom.

DETAILED DESCRIPTION

Figure 7:
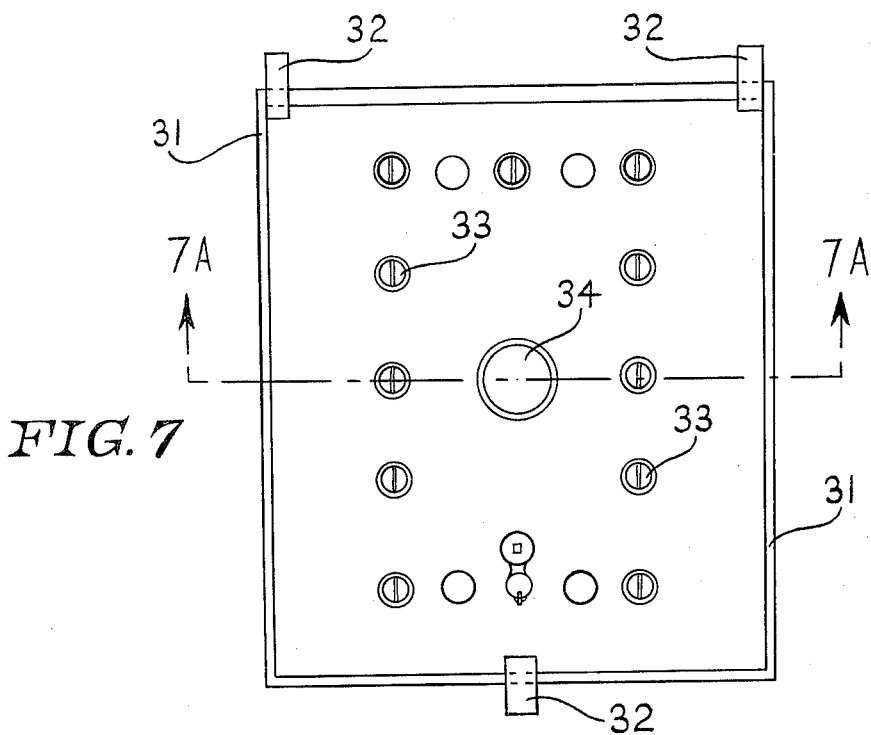
FIG. 7 is a top plan view of a gas burner positioned below the bottom of the bowl for heating the product therein.
Figure 7A:
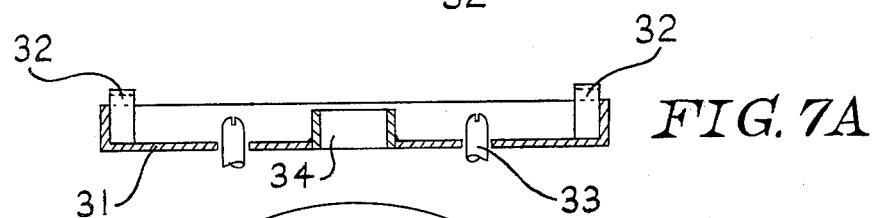
FIG. 7A is a transverse section taken in a plane indicated by line 7A — 7A in FIG. 7.
Figure 8:
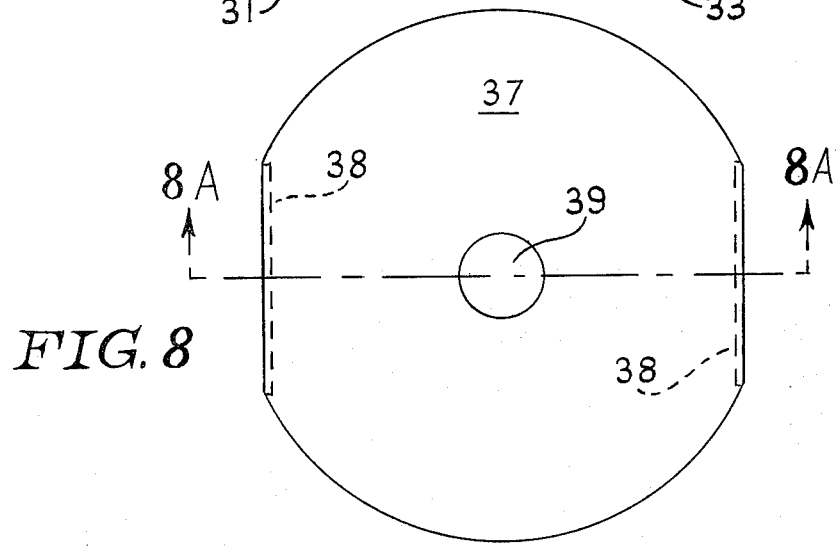
FIG. 8 is a top plan view of a flame shield employed over the burner.
Figure 8A:
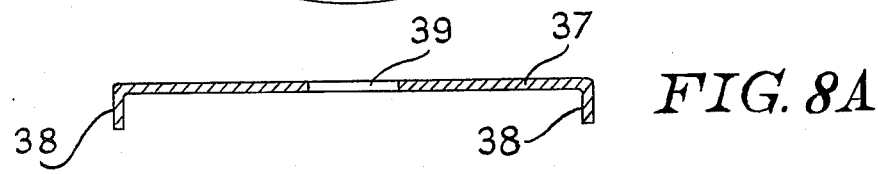
FIG. 8A is a transverse vertical section taken in a plane indicated by line 8A — 8A in FIG. 8.

The cooking apparatus comprises a bowl 2 of metal, desirably aluminum, and which has a substantially flat bottom 3 joined to cylindrical side wall 4 by curved lower edge 6, and which is open or uncovered at the top which is bounded by cylindrical top edge or rim 7. Bowl 2 is removably mounted on a support stand 8 by means of downwardly extending metal legs 9 which are formed of angle irons welded to the bowl to thus seat against open angled corners 11 formed in the top of support stand 8. Open corners 11 provide sockets in which the legs engage to hold the bowl against rotation but they permit ready detachment of the bowl as a unit for cleaning purposes when desired.

Metal scraper blades 12, desirably of aluminum, shaped to conform to the bottom of the bowl and having upwardly extending curved ends 13 which are shaped to conform to the curved lower edge 6 of the bowl are fixedly secured to, such as by welding, and extend radially at diametrically opposite points from a hub 14, desirably of aluminum. As can be seen best from FIG. 9, blade hub 14 is journalled for rotation about a metal hub 16 which is upstanding from and fixedly secured to bowl bottom 3, desirably by welding. Blades 12 are oppositely angled or pitched as can be seen from FIG. 6A; and the leading edge 15 of each blade is coated with a slip producing agent, such as "Teflon".

Means is provided for rotating or turning the blades 12 about the axis of hubs 14 and 16, comprising a shaft 21 extending upwardly through an aperture in the bowl bottom, through the top of bowl hub 16 and through the top of blade hub 14. The top end portion 22 of shaft 21 is of lesser diameter than the rest of the shaft and terminates at a lower beveled shoulder 23; a bushing 24 being provided in hub 16 underneath the top thereof to pilot shaft 21.

As can be seen best from FIG. 6, the top of bowl hub 14 is formed with a non-circular key hole 26, desirably square shaped, through which extends the upper end 21 of shaft 22 which is similarly square shaped. This provides a readily removable key connection fixedly connecting blades 12 for rotation with shaft 21. A conventional removable lock pin 27 is provided in the projecting top end 22 of the shaft. Upon disconnection of lock pin 27, it is seen that the bowl and blade structure 12, 14 can be individually removed for cleaning purposes.

Means is provided for rotating shaft 21 to move blades 12 over the bowl bottom, comprising a conventional electric motor 28; shaft 21 containing a conventional detachable joint and torque limiter coupling 29. By virtue of this connection, the bowl may be tilted on stand 8 to pour grease from the bowl without removing the entire bowl from the stand.

As was previously related, the cooking apparatus hereof is advantageously used for heating loose food products such as ground meats, as well as mixing the product during heating. Heat is applied to the bottom of the bowl, advantageously by a gas burner comprising a frame 31 mounted on support stand 8 by means of support lugs 32 (FIG. 7) and through which extend burner jets 33 connected to gas inlet pipe 35; frame 31 having an aperture 34 through which shaft 21 projects. A metal flame shield 37 is removably supported on burner frame 31 by means of downwardly extending flanges 38 resting on the frame. Shield 37 also has a cylindrical aperture 39 through which shaft 21 projects.

When loose product is being cooked, the rotating scraper blades 12 are continuously driven in one direction by motor 28; and the bottom and the curved lower edge 6 of the bowl are thus continuously scraped by the scraper blades 12 to prevent sticking of product thereto. At the same time some of the product is carried by the blades. Means is provided for breaking up continuously the product being cooked, particularly solid cold chunks present during initial cooking, and to remove product from the top of the blades which may be carried by or stuck thereto.

Such means comprises a set of downwardly projecting spaced apart teeth or prongs 41 extending across the bowl, which are fixedly secured to a cross bar 42 extending diametrically across the open top of the bowl, being supported by rim 7, and also a transversely extending set of relatively wide paddles 43 which remove product which may collect on the top faces of blades 12. Paddles 43 are fixedly attached to a second cross bar 44 supported on bowl rim 7. Thus it is seen that bars 42 and 44 provide support means for prongs 41 and for paddles 43.

These bars 42 and 44 are removably mounted on rim 7 of the bowl by quick detachable latching means. As is best shown in FIGS. 1 and 3, a pair of latching lugs 46 is provided at diametrically opposite points on the rim 7. Each lug is fixed at one end to the rim by suitable means, such as welding, and is open at 47 at its opposite end. One of said bars 42 shown in the drawings has an offset end portion 48 enabling such offset portions to be inserted underneath lugs 46 through the openings 47 which face in opposite directions. Therefore, bar 42 will remain fixed as the blades are rotated, but may be readily removed by twisting their ends 48 from under lugs 46.

Although similar latching means may be provided for bar 44 carrying paddles 43, this is not necessary because it may be readily fixedly detachably connected at the intersection with bar 42, by means of a conventional clamping pin 49 screw threaded into bar 42 and having a clamping hub 51. Instead of latching bar 42 in the manner described, bar 44 may be so latched, and bar 42 attached thereto where they intersect. It is only necessary to latch at least one of said bars to rim 7.

Usual automatic control mechanism of a conventional nature may be provided including a timer 61, on and off control switch 62, and automatic temperature control means (not shown).

From the preceding, it will be noted that when it is desired to clean the bowl and its aperternances, this may be readily done by disconnecting the prong and paddle support means 42, 44, removing them, and disconnecting shaft 21 from blade hub 14 by removing pin 27. Since the drive for the scraper blade 12 is from below the bottom of the bowl, no drive mechanism need be carried on support means on the bowl top or disconnected therefrom, as would otherwise be the case with an overhead drive. Also, it will be noted that the top of the bowl is uncovered. Therefore, vapors evolved from the product during heating may readily be vented through a vacuum hood under which the bowl may be positioned, or into the atmosphere.

I claim:

1. Apparatus for processing loose food products comprising a bowl, a rotatable drive shaft extending through the bottom of the bowl and which is drivable from below said bowl bottom, a scraper blade fixed for rotation with said drive shaft adjacent the bowl bottom to scrape product off the bottom, support means removably mounted on the rim of the bowl, and a plurality of downwardly extending prongs carried by said support means and extending across said bowl to break up product carried by the blade as the drive shaft is rotated, said support means comprising a first bar extending across the top of the bowl carrying said downwardly extending prongs, a second bar extending across the top of the bowl transversely with respect to the first bar so as to intersect the first bar and carrying downwardly extending paddles, means for securing said bars together at their intersection, and means for latching the respective ends of at least one of said bars to the top rim of the bowl.

2. The apparatus of claim 1 wherein a central hub is fixed to the bowl bottom, a plurality of scraper blades is provided each of which is fixed for rotation with a blade hub journalled for rotation on said bowl hub, said drive shaft projects through said bowl hub and through said blade hub and is removably connected to said blade hub whereby the bowl may be disconnected and removed from said shaft for cleaning purposes.

3. The apparatus of claim 1 wherein a support stand is provided for the bowl, means is provided to removably mount the bowl on the stand, and said drive shaft includes a detachable connection to enable the bowl to be tilted on said stand to pour grease therefrom.

4. The apparatus of claim 3 wherein heating means is provided on said bowl support stand below the bottom of the bowl.

5. The apparatus of claim 4 wherein said heating means is a gas burner and said drive shaft extends upwardly through said burner.

6. The apparatus of claim 3 wherein said support stand includes openings which provide sockets, and said bowl has fixed thereto downwardly extending legs removably engaging in said sockets.

7. The apparatus of claim 1 wherein each of said latching means for at least one of said bars comprises a latching lug fixed at one end to the top rim of the bowl and open at its opposite end into which a bar end is removably insertable.

8. Apparatus for loose food products comprising a cooking bowl, a support stand for said bowl having openings which provide sockets, legs fixed to said bowl extending downwardly therefrom and removably engaging in said sockets for removably supporting said bowl on said support stand, a central upstanding hub fixed to the bottom of the bowl, a scraper blade support hub journalled for rotation on said bowl hub, scraper blades extending substantially radially from and fixed to said scraper blade support hub adjacent the bowl bottom to scrape product off the bottom, a first bar extending across the top of the bowl, a second bar extending across the top of the bowl transversely with respect to the first bar so as to intersect the first bar, means for securing said bars together at their intersection, means for removably latching the ends of at least one of said bars to the top rim of said bowl, a plurality of prongs extending across the bowl downwardly from one of said bars to break up product carried by the blades, paddles extending downwardly from the other of said bars to remove product carried by said scraper blades, a drive shaft projecting through said bowl hub and through said scraper blade support hub and which is drivable from below said bowl bottom, means removably connecting said drive shaft to said scraper blade hub, a detachable connection in said drive shaft below the bowl bottom enabling the bowl to be tilted on said support stand to pour grease therefrom, and a gas burner on said support stand below the bowl bottom positioned about said drive shaft.

* * * * *